Figure 1:
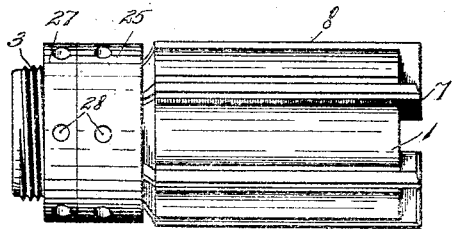

F. S. SHIELDS.
BORING AND CUTTING TOOL.
APPLICATION FILED MAY 23, 1913.

1,122,808.

Patented Dec. 29, 1914.

WITNESSES:
R. L. Bruck.
Hugh B. McGill.

INVENTOR.
Frank S. Shields
By Hull & Smith
ATTYS.

UNITED STATES PATENT OFFICE.

FRANK S. SHIELDS, OF CLEVELAND, OHIO.

BORING AND CUTTING TOOL.

1,122,808.  Specification of Letters Patent.  Patented Dec. 29, 1914.

Application filed May 23, 1913. Serial No. 769,460.

*To all whom it may concern:*

Be it known that I, FRANK S. SHIELDS, a citizen of the United States, residing at Cleveland, in the county of Cuyahoga and State of Ohio, have invented a certain new and useful Improvement in Boring and Cutting Tools, of which the following is a full, clear, and exact description, reference being had to the accompanying drawings.

This invention relates to boring and cutting tools of the class known as "reamers" and "taps", and particularly to that type of the same wherein a plurality of removable blades or cutters are employed. The advantages of employing removable blades in a device of this character have long been known, inasmuch as such construction facilitates the sharpening of the same when dulled or worn and the replacement of the same when broken. However, a great obstacle to the practical application of this idea has been the difficulty of securing these blades in place so as to be rigid and invariable, so that all of the blades might stand at the same distance from the center of the tool, and so that the blades might cut clear to the bottom of the hole. Other difficulties have been the arrangement of the blades with their outer edges truly parallel to each other, the prevention of rattling or chattering of the blades within their sockets, and the equal support of the blades so that the same might not be rocked or sprung unduly during the employment of the tool.

The object of the present invention is the provision of a tool which shall overcome these difficulties and also to provide other features of superiority which will be pointed out as the description proceeds.

In the drawings accompanying and forming a part of this application, I have illustrated certain forms of construction in which my invention may be embodied, although it will be understood that many variations therefrom are included within the scope of my inventive idea and intended to be comprised within the protection of this patent.

Figure 2:
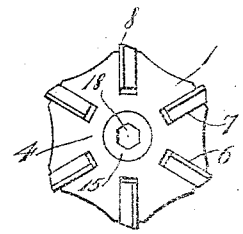
Figure 3:
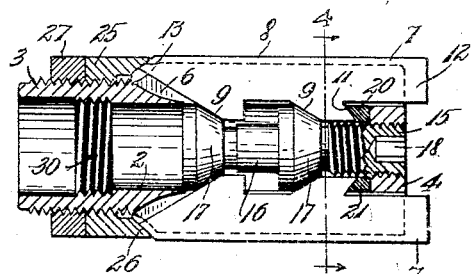
Figure 4:
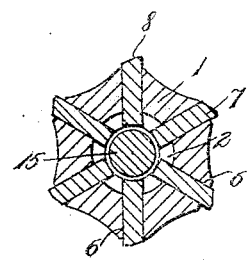
Figure 5:
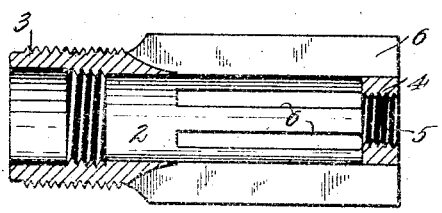
Figure 7:
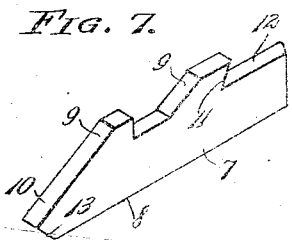
Figures 6, 8:
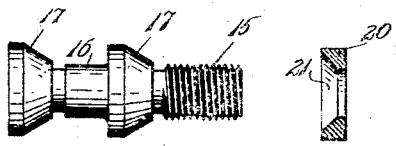
Figure 9:
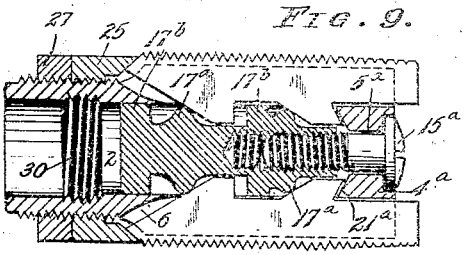

In these drawings, Figure 1 is a side elevational view of a complete reamer constructed in accordance with my invention; Fig. 2 is an end elevation thereof; Fig. 3 is a longitudinal, central, cross-sectional view of the same; Fig. 4 is a cross-sectional view of the reamer taken upon the line 4—4 of Fig. 3 and looking in the direction of the arrows; Fig. 5 is a longitudinal, cross-sectional view of the reamer shell; Fig. 6 is a view in side elevation of the adjusting member; Fig. 7 is a perspective view of one of the reamer blades; Fig. 8 is a longitudinal cross sectional view of the retaining ring; and Fig. 9 is a side elevational view of a modified form of reamer having its blades serrated for the purpose of cutting threads.

Describing the parts by reference characters, 1 represents the body of the reamer which consists of a hollow metallic shell having an internal, axial, cylindrical recess 2, opening through one of the ends thereof. Exteriorly this shell is reduced and screw-threaded as at 3 adjacent to the end through which the recess 2 opens, the opposite end of the body being traversed by a web 4 integral with the walls of the body and provided with an axial threaded aperture 5. From the threaded portion 3 to the end of the reamer body the walls of the shell are formed with longitudinally extending, angularly spaced, radial slots 6—6 and in these slots are mounted the blades or cutting members 7—7. In the form illustrated in Figs. 1 to 7 inclusive, each of these blades consists of a flat piece of tool steel having a substantially straight outer edge 8 and having at its inner edge a pair of spaced portions 9—9 inclined in the same direction one of which may, if desired, be formed as a continuation of the end of the blade, as shown at 10 in Fig. 7. Adjacent to the forward end of each blade an undercut shoulder 11 is formed upon a reëntrant incline as illustrated in Figs. 3 and 7. Beyond the shoulder 11 the blade is prolonged as at 12 so as to overhang the end of the body 1 and permit cutting the entire wall of a recess or aperture and even the milling of the bottom of that aperture in case the ends of the blades be sharpened as illustrated in Figs. 1, 2, and 7. In addition the rearward end of each of the blades is beveled as illustrated at 13 in a direction opposite to that of the inclines 9—9.

Within the recess 2 is mounted a supporting and adjusting member illustrated separately in Fig. 6, and consisting of a threaded stud 15 adapted to fit the aperture 5 and provided with a pair of spaced supports adapted to fix the position of the blades. Preferably these supports consist of integral enlargements 17—17 formed upon the shank 16, preferably of conical shape with a slope similar to that of the faces 9—9 of the blades. The end of the stud is preferably formed with a wrench receiving recess 18, and both of the enlargements fit snugly within the bore 2 as shown in Fig. 3 so as to center the blades, the thread preferably being slightly loose. The distance between the enlargements 17—17 is so chosen that their engagement with the blades will hold the latter with their outer edges at the desired angle which may be either parallel or converging.

Surrounding the stud 15 and resting against the inner face of the web 4 is a retaining ring 20 having an undercut face 21 forming an inclined shoulder adapted for engagement with the reëntrant inclines of the blades. The angle of the incline 11 (and also of the face 21) is preferably made greater than that of the faces 9—9 for a purpose which will be hereinafter disclosed. The exterior diameter of the ring 20 is sufficiently small to permit the same to lie within the extension 12—12 of the blades, as shown in Fig. 3, and fit snugly within the bore 2. Mounted upon the threaded portion 3 of the body is the securing ring 25 having at its forward edge the overhanging undercut portion 26 adapted to engage the inclined or beveled ends 13 of the blades. Mounted upon the threads 3 at the rear of this ring is a lock nut 27 whereby the ring is secured in place. Both ring and nut are preferably formed with radial apertures 28 as illustrated in Fig. 1 for the reception of a spanner wrench. The walls of the recess 2 may, if desired, be formed with screw threads, as shown at 30 by means of which the tool can be secured to a shank or spindle.

In Fig. 9 I have illustrated a slightly modified form of tool, the blades having serrations in their edges so as to produce a screw thread when advanced into an aperture. In case the device be made as illustrated in Fig. 9, the teeth on the different blades will be arranged in gradually advancing order similar to the pitch of the thread, and the blades will always be applied to the body in the same order. In the case of the device illustrated in Figs. 1 to 7 inclusive, the arrangement of the blades will ordinarily be immaterial. Also in Fig. 9, I have omitted the ring 20 forming the inner face of the web 4 upon an incline as shown at 21ª for engagement with the reëntrant inclines of the blades,—this arrangement is exactly the same in operation as that above described, though slightly more difficult to produce. Also I have shown the enlargements carried by the stem 17 as mere protuberances 17ª, 17ª formed as surfaces of revolution but omitting the conical faces, this form operating substantially like the preceding, except that the small area of contact causes the device to wear more rapidly than the first form. Enlargements 17ᵇ, 17ᵇ fitting snugly in the bore of the reamer body maintain the centers in place, while a screw 15ª located in the aperture 5ª of the web 4ª adjusts and secures the supporting member. Removal of the blades is easily effected by unscrewing the nut 27 and ring 25. Adjustment of the blades radially is readily accomplished by screwing the stud 15 in one direction or the other by means of a suitable tool inserted in the recess 18. Sharpening of the blades is effected by grinding their outer edges and not their faces, wherefore the tightness of the fit of the blades within their slots is not disturbed. The narrowing of the blades as the consequence of such grinding is taken up by adjusting the stud 15.

Reference has heretofore been made to the fact that the angle of the faces 9—9 is different than that of the reëntrant incline 11, the latter being more nearly perpendicular to the axis of the tool than the former. This arrangement is chosen to produce a construction which shall oppose the thrust of the ring 25 and also one which shall withstand the inward pressure upon the blades incident to the cutting operation. If the faces 9 and 11 were of exactly the same inclination, it is obvious that there would be no resistance to the forward and inward movement of the blades except the contact of the edges of the blades either with the bottoms of the slots 6, the surface of the ring 20, or the surface of the stud 15, the consequence being that the blades might easily become inclined to each other so as accidentally to cut a hole of a shape not desired. With the construction here illustrated, the blades are supported against inward movement entirely by the surfaces of the cones 17—17, and against longitudinal movement entirely by the face of the ring 20. So far as concerns this feature the face of the ring 20 might equally well be plane, but the undercut formation is resorted to so as to prevent the falling out of the blades upon the removal of the tool from the work. In the present embodiment, I have illustrated the surface 11 as formed with an angle of substantially forty-five degrees, and the surfaces 9—9 with an angle of substantially thirty degrees; it will be understood, however, that any angles may be employed in my invention, provided that the angle of the surface 11 to the longitudinal axis of the tool be greater than that of the surfaces 9—9. The angle of the bevel 13 may be of any degree desired, provided that it be undercut sufficiently to prevent the displacement of the blades.

It is obvious that the length and inclination of the blades can be varied; also that many other modifications in matters of detail may be made within the scope of the appended claims; and all of such modifications I esteem within the purview of my inventive idea.

Having thus described my invention, I claim:

1. In a tool of the character described, the combination, with a body having an axial bore and a plurality of longitudinally extending radial slots intersecting said bore, said body also having an internal inclined shoulder at its forward end, of a blade or cutter for each slot and adapted to project radially outside of said body, the inner edge of each blade or cutter having a reëntrant incline for engagement with said shoulder and also with a plurality of spaced portions inclined in the same direction as said first incline, the end of each blade or cutter farthest from said reëntrant incline being tapered in the opposite direction, a pair of spaced supports rigidly connected together and adapted to engage said spaced inclined portions, means for securing said supports adjustably within said body, and a securing ring carried by said body and having an overhanging portion adapted to engage the tapered ends of said blades or cutters.

2. In a tool of the character described, the combination with a body having an axial bore and a plurality of longitudinally extending radial slots intersecting said bore, said body also having an internal inclined shoulder at its forward end adjacent to and within said slots, of a blade or cutter for each slot and adapted to project radially outside of said body, the inner edge of each blade or cutter having a reëntrant incline for engagement with said shoulder, and also having spaced portions inclined in the same direction as said first incline, the angle of inclination of said first incline being greater than that of said second incline, a pair of spaced supports rigidly connected together and adapted to engage said spaced inclined portions, means for securing said supports adjustably within said body, and means carried by said body and adapted to engage the rearward ends of said blades or cutters and force said reëntrant incline against said shoulder.

3. In a tool of the character described, the combination with a body having an axial bore and a plurality of longitudinally extending radial slots intersecting said bore, said body also having an internal inclined shoulder at its forward end adjacent to and within said slots, of a blade or cutter for each slot and adapted to project radially outside of said body, each blade or cutter being formed adjacent to its forward end with an inclined portion for engagement with said shoulder, and upon its inner edge with a plurality of spaced enlargements inclined in the same direction as said first incline, and the rearward end of each blade or cutter being tapered in the opposite direction, a pair of spaced supports rigidly connected together and adapted to engage said spaced inclined portions, said supports fitting snugly within said bore, means for securing said supports adjustably along said bore, and a securing ring carried by said body and having an overhanging portion adapted to engage the tapered ends of said blades or cutters.

4. In a tool of the character described, the combination with a body having an axial bore and a plurality of longitudinally extending radial slots intersecting said bore, said body also having an undercut inclined shoulder at its forward end within and adjacent to said slots, of a blade or cutter for each slot, and adapted to project radially outside of said body, each blade or cutter being formed adjacent to its forward end with an inclined portion for engagement with said shoulder, and also having spaced portions inclined in the same direction as said first incline, the angle of said first incline being greater than that of said other inclines and the rearward end of each blade or cutter being tapered in the opposite direction, a pair of spaced supports formed as surfaces of revolution rigidly connected together and adapted to engage said spaced inclined portions, means for securing said supports adjustably within said body with their axes coinciding with that of said body, and a securing ring carried by said body and having an overhanging portion adapted to engage the tapered rearward ends of said blades or cutters.

5. In a tool of the character described, the combination with a body having an axial bore and a plurality of longitudinally extending radial slots intersecting said bore and opening through the forward end of said body, said body also having an undercut inclined shoulder at its forward end within and adjacent to said slots, of a blade or cutter in each slot and projecting radially outside of said body, the inner edge of each blade or cutter being formed at a point removed from its forward end with a reëntrant incline engaging with said shoulder, and also with a plurality of spaced portions inclined in the same direction as said first incline, the angle of said reëntrant incline being greater than that of said other inclines, the forward end of each blade or cutter projecting beyond the end of said body and their opposite ends being tapered in a direction opposite to said inclines, a supporting member slidably fitted within said bore and having a pair of spaced enlargements engaging said spaced inclined portions, means for securing said supporting member adjustably within said body, and means carried by said body and engaging the tapered rearward ends of said blades or cutters, whereby said blades are forced inwardly against said spaced enlargements.

6. In a tool of the character described, the combination, with a body having an axial bore, and a plurality of longitudinally extending radial slots intersecting said bore, said body having an inclined shoulder at its forward end within and adjacent to said slots and also having a threaded axial aperture, of a blade or cutter for each slot and adapted to project radially outside of said body, each blade or cutter being formed adjacent to its forward end with an inclined portion for engagement with said shoulder and upon its inner edge with other spaced inclined portions, the rearward end of each blade or cutter being tapered in a direction opposite to the direction of said first inclines, a threaded stud for said aperture and having a pair of spaced enlargements thereon formed as surfaces of revolution and adapted to engage the supporting portions of said blades or cutters, a portion of said stud being formed for engagement with the interior of said bore, and means carried by said body adapted to engage the tapered ends of said blades or cutters and force the same in the direction of said shoulder.

7. In a tool of the character described, the combination, with a body having an axial bore opening through its rearward end and a web traversing said opening at its forward end, said web having a threaded aperture coaxial with said bore and there being an inclined annular shoulder coaxial with said aperture inside the surface of said bore, the wall of said body being formed with a plurality of longitudinally extending radial slots opening through its forward end and extending to a point adjacent to but spaced from its rearward end, of a blade or cutter for each slot and adapted to project beyond said body both radially and longitudinally, the inner edge of each blade or cutter having a reëntrant incline for engagement with said shoulder and also having internal spaced supporting portions, a threaded stud for said aperture and having a pair of spaced enlargements thereon formed as surfaces of revolution and adapted to engage the supporting portions of said blades or cutters, and means carried by said body and engaging the rearward ends of said blades or cutters for forcing said reëntrant inclines against said shoulder.

8. In a tool of the character described, the combination, with a body having an axial bore extending from its rearward end to a point short of its forward end, such forward end being formed with an axial threaded aperture, the wall of said body being formed with a plurality of longitudinally extending radial slots terminating short of the rearward end thereof and extending through the forward end outside of said aperture and said body having an inclined shoulder coaxial with said threaded aperture inside of said slots, of a blade or cutter for each slot and adapted to project forwardly beyond the end of said body, the inner edge of each blade or cutter having a reëntrant incline for engagement with said shoulder and also having spaced supporting portions in the rear of said incline, the end of each blade or cutter farthest from said reëntrant incline being tapered in a direction opposite thereto, a threaded stud for said aperture and having a pair of spaced supporting portions thereon formed as surfaces of revolution adapted to engage the supporting portions of said blades or cutters, and a securing ring carried by said body and having an overhanging portion adapted to engage the tapered rearward ends of said blades or cutters.

9. In a tool of the character described, the combination with a body having an axial cylindrical bore, a portion of which is constricted, the wall of said body being formed with a plurality of longitudinally extending radial slots terminating short of the rearward end thereof and extending through the forward end, and said body having an inclined shoulder inside of said slots, of a blade or cutter for each slot and having an inclined portion for engagement with said shoulder and also with spaced supporting portions, the end of each blade or cutter farthest from said first incline being tapered in a direction opposite thereto, a supporting member slidably mounted in said bore and having a pair of spaced enlargements thereon adapted to engage the supporting portions of said blades or cutters, threaded means traversing the constricted portion of said bore whereby said supporting member is adjusted and held in place, and means carried by said body and adapted to engage the tapered ends of said blades or cutters to force the same toward said shoulder.

10. In a tool of the character described, the combination, with a body having an axial bore extending from its inner end to a point adjacent to but spaced from its forward end, the forward end of said body having an axial threaded aperture and an internal annular shoulder between said aperture and the inner wall of said bore, the wall of said body being formed with a plurality of longitudinally extending radial slots extending from a point removed from the rearward end thereof past said shoulder, of a blade or cutter for each slot, the inner edge of each blade or cutter having a reëntrant incline adjacent to said shoulder, and also having spaced portions inclined in the same direction as said first incline, a threaded stud for said aperture and having thereon a pair of spaced conical enlargements adapted to engage said supporting portions, a retaining ring adapted to surround said stud inside of said blades and to rest against said shoulder, the face of said ring being undercut for engagement with said reëntrant incline, and means carried by said body and adapted to engage the rearward ends of said blades or cutters and force the reëntrant inclines against said ring.

11. In a tool of the character described, the combination, with a body having an axial bore extending from its inner end to a point adjacent to but spaced from its forward end, the forward end of said body having an axial threaded aperture and an internal annular shoulder between said aperture and the inner wall of said bore, the wall of said body being formed with a plurality of longitudinally extending radial slots extending from a point removed from the rearward end thereof past said shoulder, of a blade or cutter for each slot, the inner edge of each blade or cutter having a reëntrant incline adjacent to said shoulder and also having spaced portions inclined in the same direction as said first incline, the end of each blade or cutter farthest from said reëntrant incline being tapered in the opposite direction, a threaded stud for said aperture and having thereon a pair of spaced conical enlargements adapted to engage said supporting portions, a retaining ring adapted to surround said stud inside of said blade and to rest against said shoulder, the face of said ring being undercut for engagement with said reëntrant inclines, and a securing ring carried by said body and having an overhanging portion adapted to engage the tapered ends of said blades or cutters, the slope of the inclined surface of said retaining ring being greater than that of the surfaces of said conical enlargements.

In testimony whereof, I hereunto affix my signature in the presence of two witnesses.

FRANK S. SHIELDS.

Witnesses:
HAROLD E. SMITH,
BRENNAN B. WEST.